US006190439B1

(12) United States Patent
Bresnahan et al.

(10) Patent No.: US 6,190,439 B1
(45) Date of Patent: Feb. 20, 2001

(54) METHOD AND DEVICE TO ELIMINATE OR REDUCE DÉCOR DAMAGING FRAGRANT CANDLE EMISSIONS

(76) Inventors: David Bresnahan, 9 Circle Dr., Wilkes-Barre, PA (US) 18702; Robert Hess, 12 Ashley St., Ashley, PA (US) 18706

( * ) Notice: Under 35 U.S.C. 154(b), the term of this patent shall be extended for 0 days.

(21) Appl. No.: 09/376,526

(22) Filed: Aug. 18, 1999

(51) Int. Cl.[7] .................................................. B01D 46/00
(52) U.S. Cl. .............................. 95/273; 55/385.1; 55/524; 95/285
(58) Field of Search ..................... 95/273, 285; 55/385.1, 55/386.4, 524; 96/222

(56) References Cited

U.S. PATENT DOCUMENTS

| | | |
|---|---|---|
| 712,796 | 11/1902 | Hoffmann . |
| 3,516,232 | 6/1970 | Gilbertson . |
| 4,043,776 | 8/1977 | Orel . |
| 4,218,963 | 8/1980 | Burnetter . |
| 4,237,097 | 12/1980 | McDuffie . |
| 4,781,895 | 11/1988 | Spector . |
| 4,810,185 | 3/1989 | Nakamura et al. . |
| 5,032,360 | 7/1991 | Houston . |
| 5,141,539 | 8/1992 | Iovani . |
| 5,325,876 | 7/1994 | Yang . |

*Primary Examiner*—Duane S. Smith
(74) *Attorney, Agent, or Firm*—Mitchell A. Smolow; McNees, Wallace & Nurick

(57) ABSTRACT

The present invention provides a method and device for simply, efficiently and effectively reducing or eliminating décor damaging fragrant candle emissions while permitting the fragrance to pass into a room by depositing the décor damaging emissions on the interior surface of a channel containing a filter.

20 Claims, 4 Drawing Sheets

METHOD AND DEVICE TO ELIMINATE OR REDUCE DÉCOR DAMAGING FRAGRANT CANDLE EMISSIONS

BACKGROUND OF THE INVENTION

1. Field of the Invention

This invention relates to a method and a device to eliminate or reduce décor damaging fragrant candle emissions. In recent years, candles, and in particular scented candles, have been utilized both to establish a mood and impart fragrance into the air. In addition, fragrant candles have been utilized in aroma therapy.

A problem that has been attendant with the use of these candles is that the by-products of the combustion process (i.e. soot) and the oily substances that are part and parcel of the fragrance collect and remain on walls and ceilings, causing unsightly stains and adherence points for dirt.

2. Description of the Prior Art

U.S. Pat. No. 5,032,360 to Houston which description is incorporated by reference as if fully set forth herein describes an apparatus and method for removing odors from the air. The apparatus has a candle mounted on a base and a container open at two ends located above the candle. The container houses activated charcoal. The candle causes the odor filled air to move through the container and through the activated charcoal. However, the patent to Houston does not address the problem of eliminating or reducing décor damaging candle emissions. Additionally, the user must store and replace the activated charcoal.

U.S. Pat. No. 4,218,963 to Burnetter which description is incorporated by reference as if fully set forth herein discloses a ventilating system for votive stands in which smoke and soot from a plurality of burning candies is passed through a plurality of filters. This patent is directed to a system for specifically preventing the staining of walls in churches or other buildings by the soot and smoke emitted by candles. However, this patent requires a cumbersome blower and electricity to power the blower.

U.S. Pat. Nos. 3,516,232; 4,043,776; 5,141,539; and 5,325,876 which descriptions are incorporated by reference as if fully set forth herein all disclose ashtray or cigarette smoke filtering devices in which a filtering medium is disposed above and spaced from an ashtray to filter or remove smoke, or in which a filtering medium is disposed above a table surface to filter or remove smoke.

Accordingly, what is needed is a method and a device that will simply, efficiently and effectively eliminate or reduce décor damaging candle emissions yet still allow the fragrance to pass into a room. Additionally, this method and device should provide for ease of maintenance.

SUMMARY OF THE INVENTION

In view of the foregoing problem associated with décor damaging fragrant candle emissions, and the known types of filtering apparatus now present in the prior art, the present invention provides a method and device for simply, efficiently and effectively reducing or eliminating décor damaging fragrant candle emissions while permitting the fragrance to pass into a room. Additionally, this method and device should provide for ease of maintenance. The method comprises the steps of:

a) positioning a filter within a channel having an interior and exterior surface and a superior and inferior opening, such that the superior opening is smaller in diameter than the inferior opening; and b) positioning the channel above a fragrant candle, such that décor damaging emissions collect on the filter and on the interior surface of the channel without allowing said emissions to recirculate and roll out from under said channel and escape into a room; and c) allowing the fragrance to pass through the channel and the filter into the room.

In accordance with another form of the invention, a filter is removably positioned within a channel and the channel is then removably positioned above a container containing a fragrant candle such that the décor damaging emissions collect on the interior surface of the filter and the interior surface of the channel.

The device of this invention comprises a filter removably attached to a candle holding base, the filter being removably covered by a channel. The channel has an interior and exterior surface and a superior and inferior opening, such that the superior opening is smaller in diameter than the inferior opening. The filter and the inferior channel opening are positioned such that décor damaging emissions collect on the filter and on the interior surface of the channel without allowing the emissions to recirculate and roll out from under the channel and escape into a room, while allowing the fragrance to pass through the channel and the filter into the room.

The invention resides not in any one of these features alone, but rather in the particular combination of all of them disclosed herein and claimed, and it is distinguished from the prior art in this particular combination of all of its structures for the function specified.

The more important features of the invention have been outlined in order that the detailed description that follows may be better understood, and in order that the present contribution to the art may be better appreciated. Additional features of the invention will be further described and they will form the subject matter of the claims appended hereto. Those skilled in the art will appreciate that the conception upon which this disclosure is based may be readily utilized as a basis for the designing of other structures, methods, and systems for carrying out several purposes of the present invention. It is important, therefore, that the claims be regarded as including such equivalent constructions insofar as they did not depart from the spirit and scope of the present invention.

BRIEF DESCRIPTION OF THE DRAWINGS

These and other features, aspects and advantages of the present invention will become better understood with regard to the following description, appended claims, and accompanying drawings where:

DESCRIPTION

Figure 1:
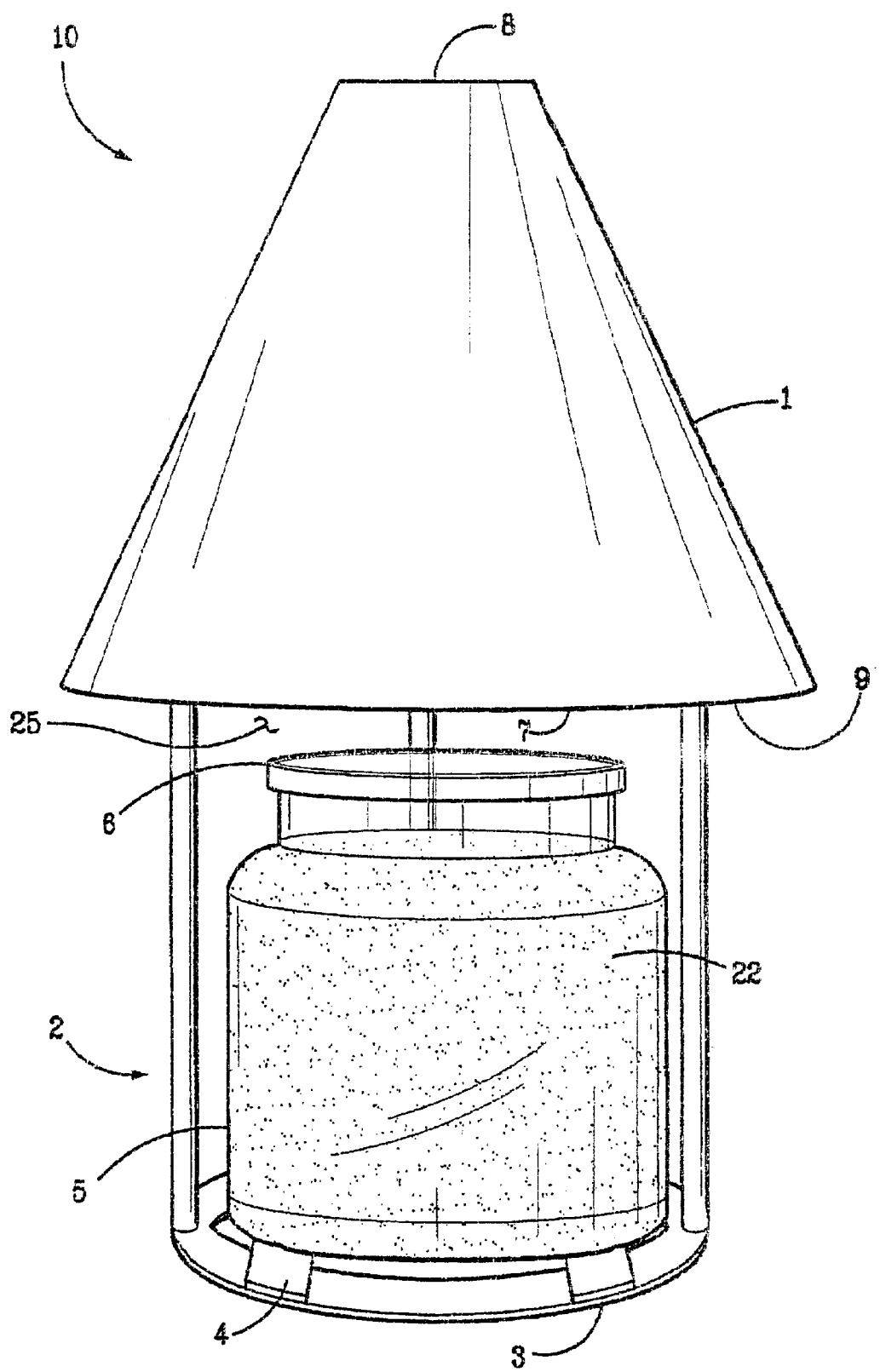
FIG. 1 is a perspective view of the embodiment of the invention with a candle in a glass container in place according to one embodiment thereof.

Referring to the drawings in detail, wherein like numerals designate like parts, and in particular referring now to FIG.

1, there is provided a method and device to eliminate or reduce décor damaging fragrant candle emissions 10 having a channel 1 removably attached to a base unit 2. Because combustion is associated with the device 10, the channel 1 and base unit 2 are all non-flammable, preferably made of metal.

Figure 3:
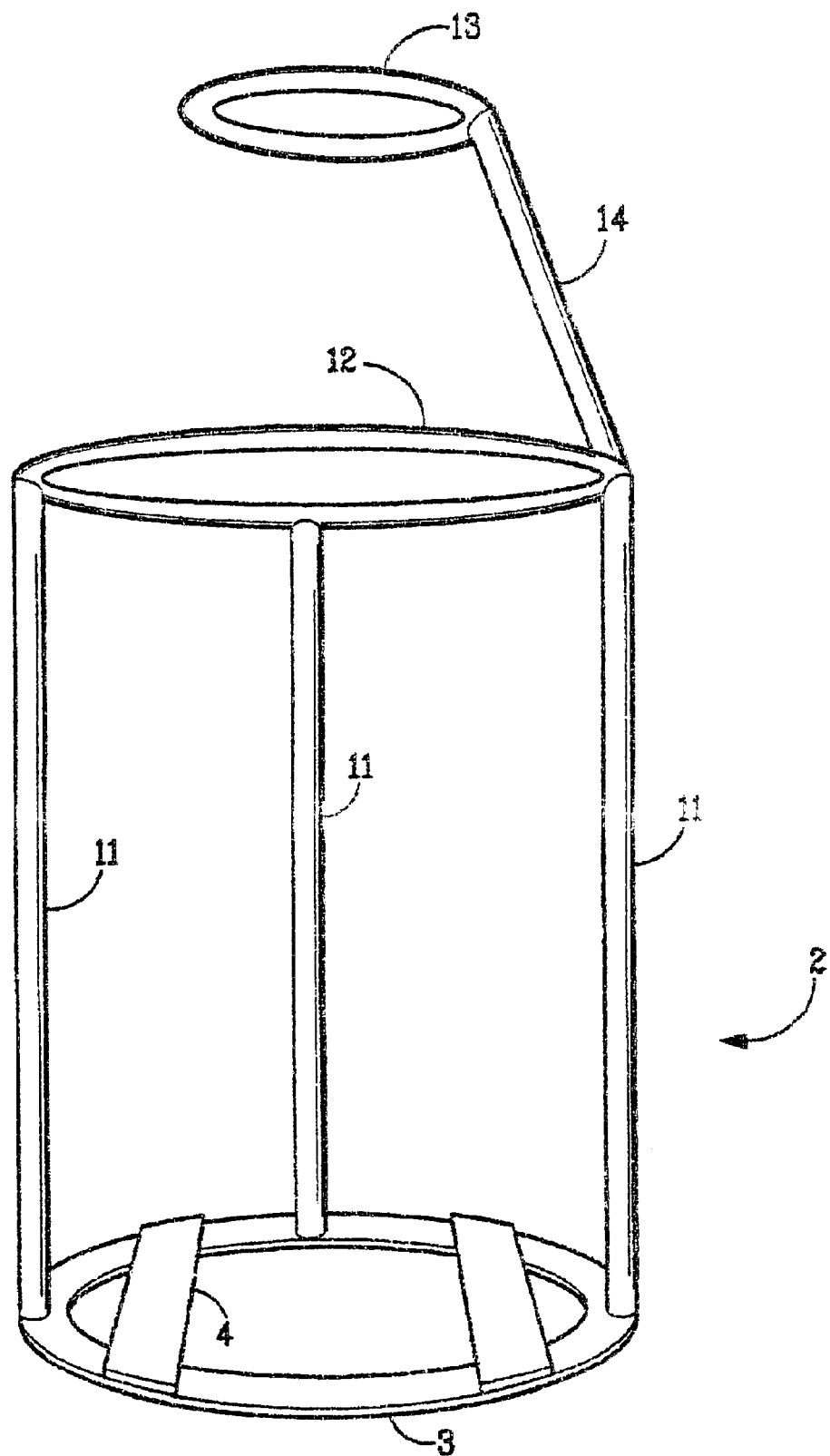
FIG. 3 is a view from an occlusal aspect of the embodiment of the invention with the filter removed.

Referring now to FIG. 3, the base unit 2 has a base support 3, preferably round in shape, having a vertical support 11 and preferably a plurality of vertical supports 11 and most preferably having three vertical supports 11 connecting the base support 3 to a channel bottom support ring 12. Preferably the channel bottom support ring 12 is round in shape. The channel bottom support ring 12 is attached to one end of a channel top vertical support 14. The other end of the channel top vertical support 14 is connected to a channel top support ring 13. Preferably the channel top support ring 13 is round in shape and preferably the channel top vertical support 14 forms an acute angle with the plane of the channel bottom support ring 12.

Figure 2A:
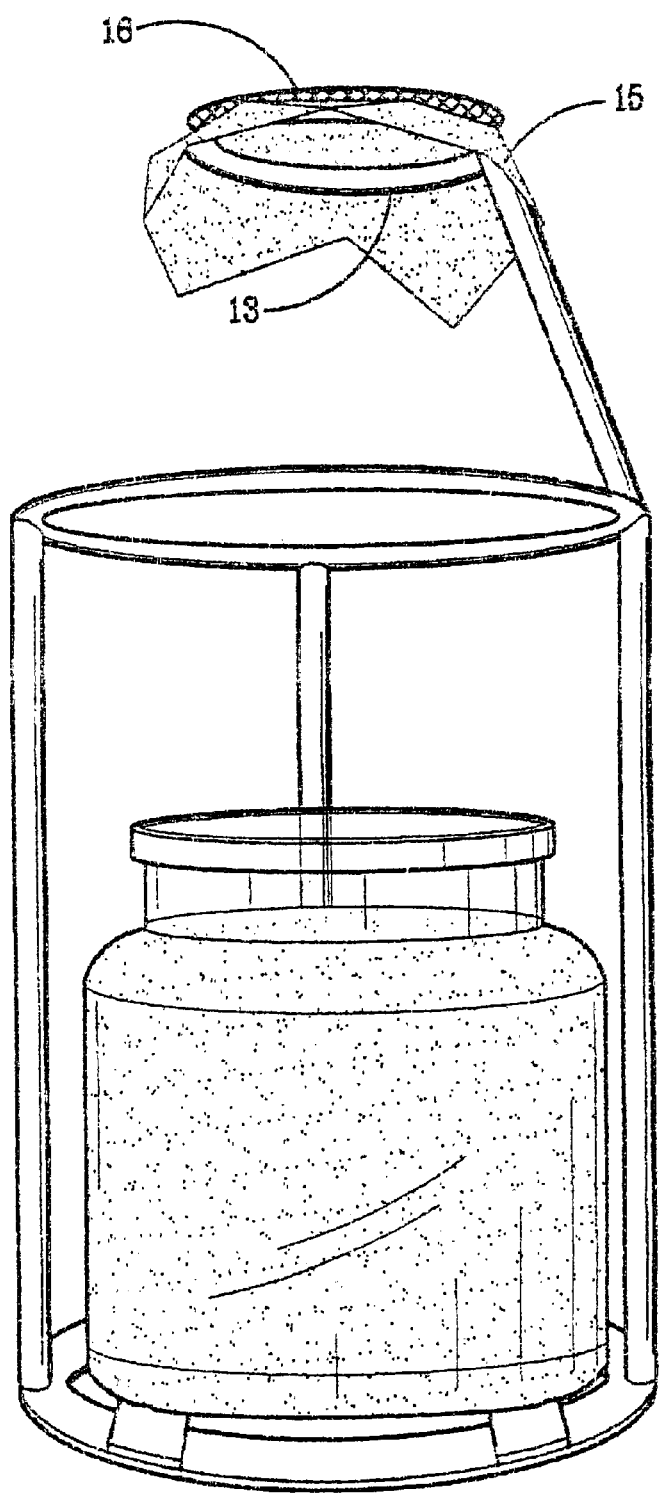
FIG. 2A is a perspective view of the embodiment of the invention with the channel removed and the optional filter retaining screen in place.

Referring now to FIG. 2A, a filter 15 is placed on top of, and preferably removably placed on top of the channel top support ring 13. The filter 15 is preferably flame retardant. In the preferred embodiment, the filter 15 is terry cloth treated with an aqueous-based fire retardant such as FABRIC SEAL (S) manufactured by Flame Seal Products, Inc., so as to make it flame retardant. Alternatively, the filter may be made of cotton canvass, NYLON, a polyamide; NOMEX, a polyaramid; fiberglass, felt, glass beads, polyester, other synthetic fibers, wire mesh and the like. The filter 15 which has been removably draped over the channel top support ring 13 is held in place by the weight of the channel 1 (as described in FIG. 1) after the channel 1 has been removably placed over the channel top support ring 13.

Figure 2B:
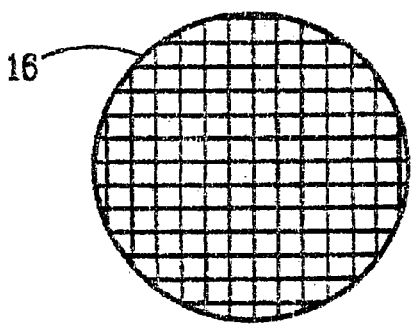
FIG. 2B is an occlusal view of the embodiment of the optional filter retaining screen.

Alternatively, as described in FIG. 2B, the filter 15 is removably placed on top of the channel top support ring 13, then removably covered and retained with a filter retaining screen 16. The filter retaining screen is held in place by the weight of the channel 1 (as described in FIG. 1) after the channel 1 has been removably placed over the filter retaining screen 16. In the unlikely event of the filtering material igniting, the filter retaining screen 16 provides additional safety by preventing convective air flows from carrying small pieces of burning filter into the room. The filter retaining screen 16 also serves to center the channel 1.

Figure 4:
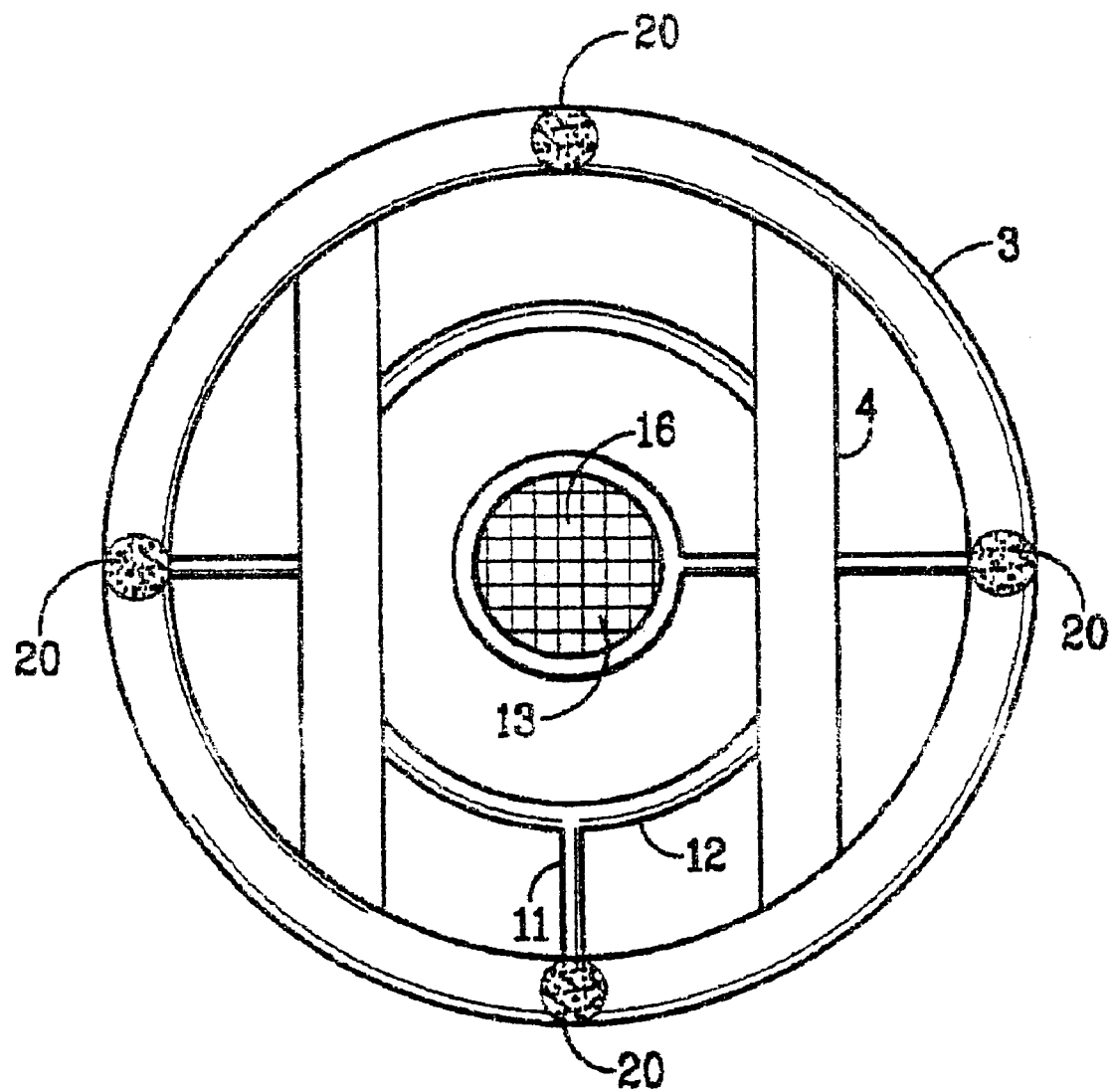
FIG. 4 is an occlusal view of the embodiment of the channel.

Referring now to FIG. 4, there are a plurality of candle supports 4 fixedly attached to the base support 3 such that when a candle container 5 such as shown in FIG. 1 is placed on the candle supports 4 there remains a space between the bottom of the candle container 5 (FIG. 1) and the surface that the device is resting upon, so as to reduce any thermal transfer between the candle container 5 (FIG. 1 ) and the surface that the device is resting upon. Fixedly attached to the base support 3 are a plurality of pads 20, preferably felt pads, so as to minimize damage to the surface the device is resting upon. Alternatively, the pads may be made of rubber, plastic, and the like.

Returning to FIG. 1, the channel 1 has a channel top opening 8 and a channel bottom opening 9. Preferably both the channel top opening 8 and the channel bottom opening 9 are round and the channel top opening 8 is smaller in diameter than the channel bottom opening 9, so that, in profile, the channel 1 has the appearance of an inverted funnel. If the channel top opening 8 is too small relative to the channel bottom opening 9, the candle emissions will recirculate within the channel 1 and escape out of the bottom of the channel 1 into the room. An effective channel top opening 8 to channel bottom opening 9 ratio is about 0.1:1 to about 0.9:1 and preferably about 0.35:1. In the preferred embodiment, the channel top opening 8 has a diameter of about 2.13 inches and the channel bottom opening 9 has a diameter of about 6.13 inches.

In the preferred embodiment, the candle container 5 is a jar, preferably a glass jar, having a candle container top edge 6. When viewed in profile, as displayed in FIG. 1, there should be a space 25 between the channel bottom edge 7 and the candle container top edge 6 of about 0.25 inches to about 2 inches and preferably about 0.88 inches. Preferably, the plane of the channel bottom edge 7 should be about parallel to the plane of the candle container top edge 6.

When properly positioned above the candle container top edge 6, the filter 15 and channel 1 allows for proper collection of the candle emissions (i.e. smoke) and does not allow the emissions to recirculate and roll out from under the channel 1 and escape into the room.

The filter 15 is placed far enough from the candle container top edge 6 so as to aid in the collection of the candle emissions yet not so close as to scorch or to allow the emissions to recirculate and roll out from under the channel 1 and escape into the room. Preferably this distance is between about 3.5 and about 7.5 inches and most preferably is about 5.69 inches.

The method and device to eliminate or reduce décor damaging candle emissions operates as follows:

With the channel 1 removed, a filter 15 is placed on top of the channel top support ring 13, optionally covered with a filter retaining screen 16 and then the channel is placed over (thereby holding in place) the filter 15 and optional filter retaining screen 16. The channel 1 is held in place by the channel top support ring 13 and stabilized by the channel bottom support ring 12. A candle container 5 containing a fragrant candle 22 is placed on top of the candle support 4. While the fragrant candle 22 is burning, the candle emissions travel upwardly due to the heat generated by the flame of the candle. The passing of the emissions through the channel is accomplished due to the chimney effect. The décor damaging emissions then collect on the underside of both the channel 1 and the filter 15 while allowing the desired fragrance to pass through the filter 15, the optional filter retaining screen 21 and through the channel top opening 8 into the room. The alignment of the filter 15, channel edge bottom 7 and candle container top edge 6 prevents the emissions from recirculating and rolling out from under the channel 1 and escaping into the room.

Between uses, the filter which has collected décor damaging emissions may be either washed or discarded and replaced with a clean or new filter. Additionally, the décor damaging emissions which, as a result of the convective process, have collected in substantial amounts on the underside of the channel 1 may be removed through a simple cleansing procedure such as hand washing or placing the channel 1 in an automatic dishwasher.

With respect to the above description then, it is to be realized that the optimum dimensional relationship for the part of the invention, to include variations in size, materials, shape, form, functions, and manner of operation, assembly and use, are deemed readily apparent and obvious to one skilled in the art, and all equivalent relationship to those illustrated in the drawings and described in the specification are intended to be encompassed by the present invention.

From the above description of the preferred embodiment, it will be apparent that many modifications may be made therein without departing from the true spirit and scope of

We claim:

1. A method for reducing or eliminating décor damaging fragrant candle emissions comprising the steps of:
   a) positioning a filter within a channel, said channel having an interior and exterior surface and a superior and inferior opening, such that said superior opening is smaller in diameter than said inferior opening; and
   d) removably positioning said channel above a candle, such that décor damaging emissions collect on said filter and on said interior surface of said channel without allowing said emissions to recirculate and roll out from under said channel and escape into a room; and
   e) allowing the fragrance to pass through said channel and said filter into the room.

2. The method of claim 1 whereby the fragrant candle is contained thin a container, said container having a superior edge.

3. The method of claim 2 wherein the filter is removable.

4. The method of claim 2 wherein the filter is flame retardant treated terry cloth.

5. The method of claim 2 wherein the inferior opening of the channel is positioned about 0.88 inches above the superior edge of the candle container.

6. The method of claim 2 wherein the filter is positioned about 5.69 inches above the superior edge of the candle container.

7. The method of claim 6 wherein the inferior opening of the channel is positioned about 0.88 inches above the superior edge of the candle container.

8. The method of claim 6 wherein the candle container is a glass jar.

9. The method of claim 2 wherein the ratio of the diameter of the superior channel opening to the diameter of the inferior channel opening is about 0.35:1.

10. The method of claim 2 wherein the diameter of the superior channel opening is about 2.13 inches and the diameter of the inferior channel opening is about 6.13 inches.

11. A device to eliminate or reduce décor damaging fragrant candle emissions comprising;
    a filter attached to a candle holding base, said filter removably covered by a channel;
    said channel having an interior and exterior surface and a superior and inferior opening, such that said superior opening is smaller in diameter than said inferior opening;
    said filter and said inferior channel opening positioned such that décor damaging emissions collect on said filter and on said interior surface of said channel without allowing said emissions to recirculate and roll out from under said channel and escape into a room, while allowing the fragrance to pass through said channel and said filter into the room.

12. The device of claim 11 where the fragrant candle is contained within a container, said container having a superior edge.

13. The device of claim 12 wherein the filter is removable.

14. The device of claim 12 wherein the filter is flame retardant treated terry cloth.

15. The device of claim 12 wherein the inferior opening of the channel is positioned about 0.88 inches above the superior edge of the candle container.

16. The device of claim 12 wherein the filter is positioned about 5.69 inches above the superior edge of the candle container.

17. The device of claim 16 wherein the inferior opening of the channel is positioned about 0.88 inches above the superior edge of the candle container.

18. The device of claim 12 wherein the candle container is a glass jar.

19. The device of claim 12 wherein the ratio of the diameter of the superior channel opening to the diameter of the inferior channel opening is about 0.35:1.

20. The device of claim 12 wherein the diameter of the superior channel opening is about 2.13 inches and the diameter of the inferior channel opening is about 6.13 inches.

* * * * *

UNITED STATES PATENT AND TRADEMARK OFFICE
CERTIFICATE OF CORRECTION

PATENT NO. : 6,190,439 B1                                                           Page 1 of 1
DATED : February 20, 2001
INVENTOR(S) : Bresnahan, et al.

It is certified that error appears in the above-identified patent and that said Letters Patent is hereby corrected as shown below:

<u>Column 5,</u>
Line 19; the word "thin" should read -- within --.

Signed and Sealed this

Fourteenth Day of August, 2001

Attest:

Attesting Officer

NICHOLAS P. GODICI
*Acting Director of the United States Patent and Trademark Office*